United States Patent [19]

Munezawa et al.

[11] Patent Number: 4,468,687
[45] Date of Patent: Aug. 28, 1984

[54] TELEVISION SYNCHRONIZING SIGNAL REPRODUCING APPARATUS

[75] Inventors: Kazushi Munezawa; Toshihiko Tsuru, both of Tokyo, Japan

[73] Assignee: Nippon Electric Co., Ltd., Tokyo, Japan

[21] Appl. No.: 375,604

[22] Filed: May 6, 1982

[30] Foreign Application Priority Data

May 7, 1981 [JP] Japan .................................. 56-68581

[51] Int. Cl.$^3$ .............................................. H04N 9/46
[52] U.S. Cl. ..................................................... 358/19
[58] Field of Search .................... 358/19, 17, 150, 148, 358/149, 158; 331/20

[56] References Cited

U.S. PATENT DOCUMENTS

| | | | |
|---|---|---|---|
| 4,122,488 | 10/1978 | Mikado | 358/19 |
| 4,159,481 | 6/1979 | Mikado | 358/19 |
| 4,203,135 | 5/1980 | Sasaki | 358/19 |
| 4,291,332 | 9/1981 | Kato | 358/19 |
| 4,390,892 | 3/1982 | Banks | 358/150 |

Primary Examiner—Michael A. Masinick

Attorney, Agent, or Firm—Sughrue, Mion, Zinn, Macpeak and Seas

[57] ABSTRACT

An apparatus for reproducing television synchronizing signals receives an input composite television video signal, separates synchronizing signals therefrom, and utilizes a separated horizontal synchronizing signal to separate a burst signal from the input. The burst signal is then provided through a phase-locked loop including a voltage controlled oscillator (VCO) and frequency divider. The separated horizontal sync signal is also provided through a phase-locked loop including a VCO and frequency divider. During reception of a color TV signal, a synchronizing signal generator receives the output of the first VCO as its clock and receives a horizontal reset pulse derived from the reproduced subcarrier output of the first phase-locked loop and the output of the second phase-locked loop, with the output of the frequency divider in the second phase-locked loop being provided back to its phase detector. When a black-and-white input signal is detected, the output of the VCO in the second phase-locked loop is provided as the clock input to the synchronizing signal generator and a horizontal driving signal output from the synchronizing signal generator is fed back as an input to the phase detector of the second loop.

8 Claims, 6 Drawing Figures

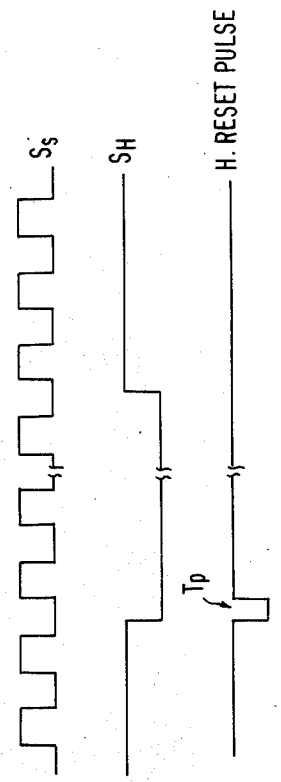
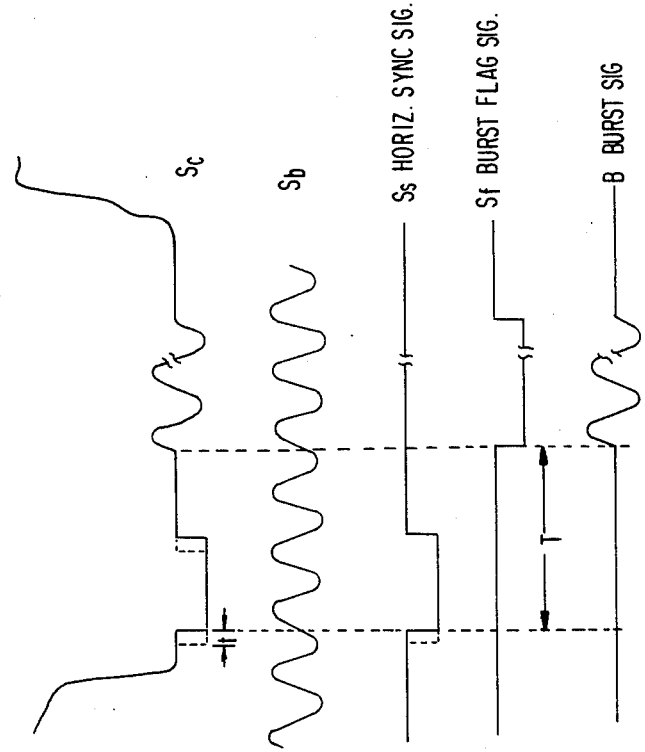
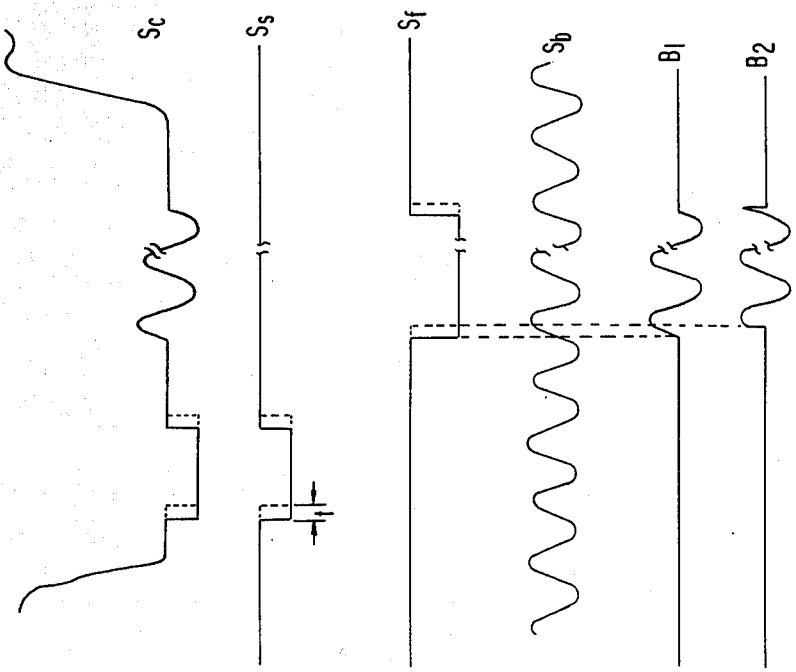
FIG. 2 PRIOR ART
FIG. 4
FIG. 5

TELEVISION SYNCHRONIZING SIGNAL REPRODUCING APPARATUS

BACKGROUND OF THE INVENTION

The present invention relates to a television synchronizing signal reproducing apparatus which receives a television composite video signal and reproduces synchronizing signals such as a composite synchronizing signal including horizontal and vertical synchronizing signals, a composite blanking signal, a burst flag signal, burst signal, etc.

During transmission or processing of a television video signal, both of the synchronizing signals and an associated burst signal are subject to distortion and their levels are subject to variations due to either the transmission line or a processing circuit. Further, the positional relationship between the horizontal synchronizing signal and the burst signal is frequently altered during transmission or processing. The processing circuits may include a mixing circuit, a circuit for generating special effects, and the like.

The synchronization signals contained in a television video signal should be maintained at their predetermined standards, because they are used as references for the proper operation of a variety of television equipment such as a television monitor. In order to eliminate distortion, a television synchronizing signal reproducing apparatus is generally used to "reproduce" synchronizing signals, such signals being substituted for the original synchronizing signals contained in a television composite video signal which has been distorted during its transmission through the transmission line or the processing circuit.

In one prior art television synchronizing signal reproducing apparatus, a first circuit receiving a burst signal extracted from an input television video signal reproduces a subcarrier signal. A second circuit receiving horizontal and vertical synchronizing signals extracted from the input television video signal reproduces synchronizing signals such as a composite synchronizing signal, a composite blanking signal, a burst flag signal and horizontal and vertical driving signals. In this apparatus, the reproduced burst signal is "framed" by extracting the reproduced subcarrier in response to this burst flag signal. According to the prior art television synchronizing signal reproducing apparatus, the two circuits, i.e., the circuit for producing the subcarrier and the circuit for producing the synchronizing signal, including the burst flag signal operate independently of each other. Therefore, when the position-relationship between the synchronizing signals, particularly the horizontal synchronizing signal, and the burst signal contained in the input television video signal is changed, or when the horizontal synchronizing signal contained in the input television composite video signal is distorted, the leading edge and the trailing edge of the burst flag signal are not coincident with the zero crossing point of the reproduced subcarrier. As a result, the reproduced burst signal does not begin with a zero crossing point. In other words, the reproduced burst signal contains the distortion of the waveform and the phase error.

Generally, it is recommended that the beginning and the termination of the burst signal are coincident with the zero crossing point of the subcarrier signal, and that the period from the leading edge of the horizontal synchronizing signal to the beginning of the burst signal is kept to be an integer multiple of the period of one cycle of the subcarrier signal. However, the prior art television synchronizing signal reproducing apparatus described above does not satisfy these requirements.

SUMMARY OF THE INVENTION

It is, therefore, an object of the present invention to provide a television synchronizing signal reproducing apparatus capable of reproducing a burst signal in which the beginning and the termination of the burst signal are coincident with a zero crossing point of itself.

Another object of the present invention is to provide a television synchronizing signal reproducing apparatus capable of reproducing a composite synchronizing signal including horizontal and vertical synchronizing signals and a burst signal, in which the period from the front edge of the horizontal synchronizing signal to the beginning of the burst signal is always maintained to be an integer multiple of the period of the subcarrier.

According to the present invention, there is provided a television synchronizing signal reproducing apparatus comprising: a signal separator for separating horizontal and vertical synchronizing signals and a burst signal from an input television composite video signal; a first phase-locked loop circuit for producing a first signal having the frequency of the horizontal synchronizing frequency in synchronism with the separated horizontal synchronizing signal; a second phase-locked loop circuit for producing a second signal having a frequency n-times the period of the color subcarrier signal in synchronism with the separated burst signal, where n is an integer; a frequency-divider for dividing the second signal to obtain the color subcarrier; means for producing a horizontal reset pulse which is extracted from the color subcarrier by using the timing of the first signal; and a synchronization signal producing unit for producing one or more of the synchronizing signals such as a composite synchronizing signal, a composite blanking signal or a color burst flag signal, which receives the second signal as a clock and is reset by the horizontal reset pulse.

BRIEF DESCRIPTION OF THE DRAWINGS

FIG. 2 is a time-sequence diagram of the internal waveforms of the apparatus shown in FIG. 1;

FIG. 4 is a diagram of the waveforms of a horizontal; reset pulse generator shown in FIG. 3;

FIG. 5 is a time-sequence diagram of the internal waveforms of the apparatus of the present invention.

DESCRIPTION OF THE PRIOR ART

Preferred Embodiment of the Present Invention

Figure 1:
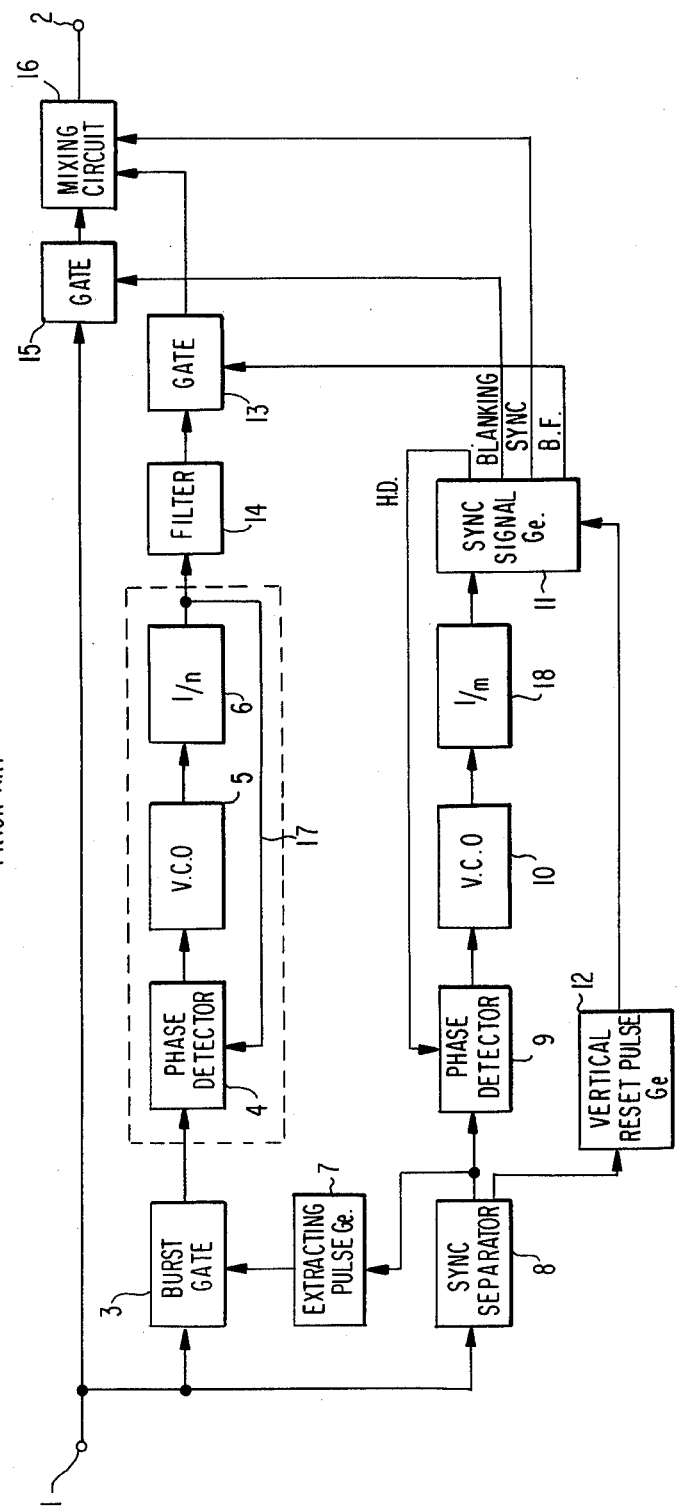
FIG. 1 is a block diagram showing a prior art television synchronizing signal reproducing apparatus.

Referring to FIG. 1, a prior art television synchronizing signal reproducing apparatus will be explained to in detail in order to assist in the understanding of the present invention. In this figure, a burst signal is separated by a burst gate 3 from a composite video signal that is introduced from an input terminal 1. The burst gate 3 is driven by an extracting pulse that is generated in an extracting pulse generator 7 in response to a horizontal synchronizing signal delivered from a synchronizing signal separator 8. The burst signal delivered from the burst gate is supplied to a phase-locked loop circuit 17 including a phase detector 4, a voltage-controlled oscillator 5 and a frequency-divider 6. The phase-locked loop circuit 17 produces a signal of the color subcarrier frequency. The color subcarrier is delivered from a filter 14. The horizontal synchronizing signal delivered from the synchronizing signal separator 8 is supplied to another phase-locked loop circuit for producing synchronizing signals such as a horizontal driving signal, a vertical driving signal, a composite synchronizing signal, a composite blanking signal and a burst flag signal. This phased-locked loop circuit contains a phase detector 9, a voltage-controlled oscillator 10, frequency-divider 18 and a synchronizing signal generator 11 which receives the output of the frequency-divider 18 as a clock and outputs the synchronizing signals described above. In this phase-locked loop, the horizontal driving signal delivered from the generator 11 is fed back to the phase detector 9. The synchronizing signal generator 11 is reset by vertical synchronization timing produced in a vertical reset pulse generator 12 which receives a separated vertical synchronizing signal from the synchronizing signal separator 8.

The reproduced subcarrier signal delivered from the filter 14 and the reproduced composite synchronizing signal are substituted for the original burst signal and the original composite synchronizing signal in the input television video signal as explained hereinafter. The reproduced subcarrier signal from the filter 14 is gated in response to the burst flag signal delivered from the synchronizing signal generator 11 in a burst gate 13 and the gated subcarrier is transmitted to a mixing circuit 16 as a burst signal. In a gate 15, the original composite synchronizing signal and the original burst signal contained in the input television signal are removed by the control of the composite blanking signal delivered from the synchronizing signal generator 11. The reproduced burst signal delivered from the gate 13 and the reproduced composite synchronizing signal are added to the television video signal delivered from the gate 15 in the mixing circuit 16. Therefore, the television video signal with the reproduced burst signal and the reproduced composite synchronizing signal is transmitted to an output terminal 2. An integrated circuit (IC) having the function of the synchronizing signal generator 11 is currently offered in the market and is readily available. One example of such an IC is the 3262A or the 3262B produced by Fairchild Camera and Instrument Corporation.

FIG. 2 shows waveforms of the main portions of FIG. 1, i.e., a portion of the input composite television video signal $S_c$ including the horizontal synchronizing signal and the burst signal, the separated horizontal synchronizing signal $S_s$ from the composite television video signal $S_c$, the produced burst flag signal $S_f$, the reproduced subcarrier $S_b$ and reproduced burst signals $B_1$ and $B_2$ framed in response to the burst flag signal $S_f$. In case of no distortion, the composite video signal $S_c$, the separated horizontal synchronizing signal $S_s$ and the burst flag signal $S_f$ are illustrated by the solid lines. In this case, the reproduced burst signal $B_1$ begins from a zero crossing point of the color subcarrier signal and terminates at a zero crossing point. On the other hand, in the case where a transmission line or a video processing circuit has a distortional characteristic, the positional relationship between the horizontal synchronizing signal and the burst signal in the composite video signal $S_c$ deviates as shown in FIG. 2 by the period t.

Since the first circuit for reproducing the subcarrier signal and the second circuit for reproducing the synchronizing signal operate independently of each other, the produced burst flag signal $S_f$ also deviates by the period t. As a result, the reproduced burst signal $B_2$ shown in FIG. 2 is obtained, and the beginning and termination points of the burst signal $B_2$ are not coincident with a zero cross point.

DETAIL DESCRIPTION OF THE PREFERRED EMBODIMENTS

Figure 3:
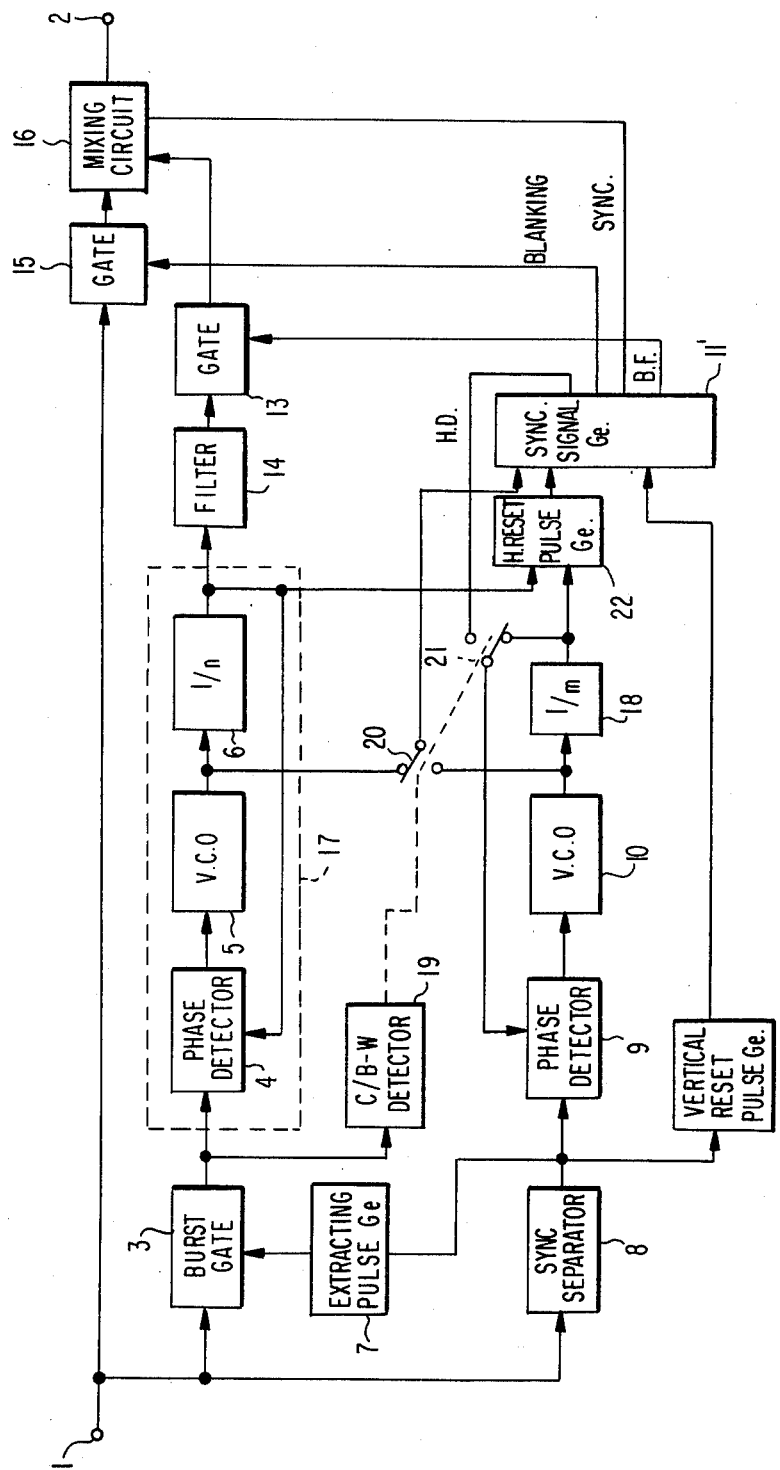
FIG. 3 is a block diagram of an embodiment according to the present invention.

Turning to FIG. 3 showing an embodiment of the present invention, blocks having the same function as those of FIG. 1 are denoted by the same reference numerals. The main difference between the prior art television synchronizing signal reproducing apparatus as shown in FIG. 1 and the present invention as shown in FIG. 3 are that (1) a television synchronizing signal generator 11' receives a signal having frequency n-times that of the subcarrier delivered from a voltage-controlled oscillator 5 as a clock; (2) the television synchronizing signal generator 11' is further reset by a reset pulse delivered from a horizontal reset pulse generator 22 in which one timing is extracted from the subcarrier delivered from a frequency-divider 6 by using the timing of a horizontal synchronizing signal delivered through a frequency-divider 18; and (3) in a phase-locked circuit for producing the horizontal synchronizing signal containing a phase-detector 9, a voltage-controlled oscillator 10 and the frequency-divider 18, the output of the frequency-divider 18 is supplied to the phase detector for phase-lock. Furthermore, the embodiment shown in FIG. 3 contains selectors 20 and 21 which are controlled by a color/black-white detector 19. The color/black-white detector 19 detects whether an input video signal from a terminal 1 is a color video signal or a black-white video signal by extracting a burst signal. FIG. 3 indicates the case for color video signal treatment. If a black-white video signal is applied, the synchronizing signal generator 11' receives the output of the voltage-controlled oscillator 10 through the selector 20 and the phase-detector 9 receives a horizontal driving signal delivered from the synchronizing signal generator 11' through the selector 21.

In this embodiment of the present invention, the frequency-dividing ratio m of the frequency-divider 18 and the frequency-dividing ratio n of the frequency-divider 6 are predetermined to satisfy $mf_H = N f_{sc}$ ($f_H$ being the horizontal synchronizing frequency and $f_{sc}$ being the subcarrier frequency). For example, the frequency-dividing ratios m and n can be 910 and 4, respectively.

The reset pulse generator 22 comprises a R-S flip-flop which receives the subcarrier signal delivered from the frequency-divider 6 as a set pulse and the horizontal synchronizing signal delivered from the frequency-divider 18 as a reset pulse. FIG. 4 shows waveforms of the subcarrier $S_s$, the horizontal synchronizing signal $S_H$ and the output of the R-S flip-flop. The synchronizing signal generator 11' is reset at the timing $T_p$ illustrated in FIG. 4.

According to the present invention, since the synchronizing signal generator 11' is reset by the reset pulse synchronized with the subcarrier signal, and since the signal generator 11' receives the n-times frequency of the subcarrier as the clock, its reproduced burst signal starts at a zero crossing point and the period between the leading edge of the reproduced horizontal synchronizing signal and the beginning of the reproduced burst signal is kept to be an integer multiple of the period of the subcarrier signal. FIG. 5 shows the operation of the present invention. In this Figure, when the phase-relationship between the horizontal synchronizing signal and the burst signal deviates by t as indicated by broken lines due to a transmission line or a processing circuit, the reproduced horizontal synchronizing signal $S_s$ starts at a zero cross point of the subcarrier, and the burst flag signal $S_f$ starts after the period T from the leading edge of the reproduced horizontal synchronizing signal $S_s$. The period T is a predetermined integer multiple times of the subcarrier period. Consequently, the reproduced burst signal B begins at a zero crossing point and terminates at a zero crossing point. The phase of the reproduced horizontal synchronizing signal $S_s$ deviates from the phase of the horizontal synchronizing signal contained in the input video signal by t. However, the period t is always less than one cycle period of the subcarrier and is negligible in practice.

Figure 6:
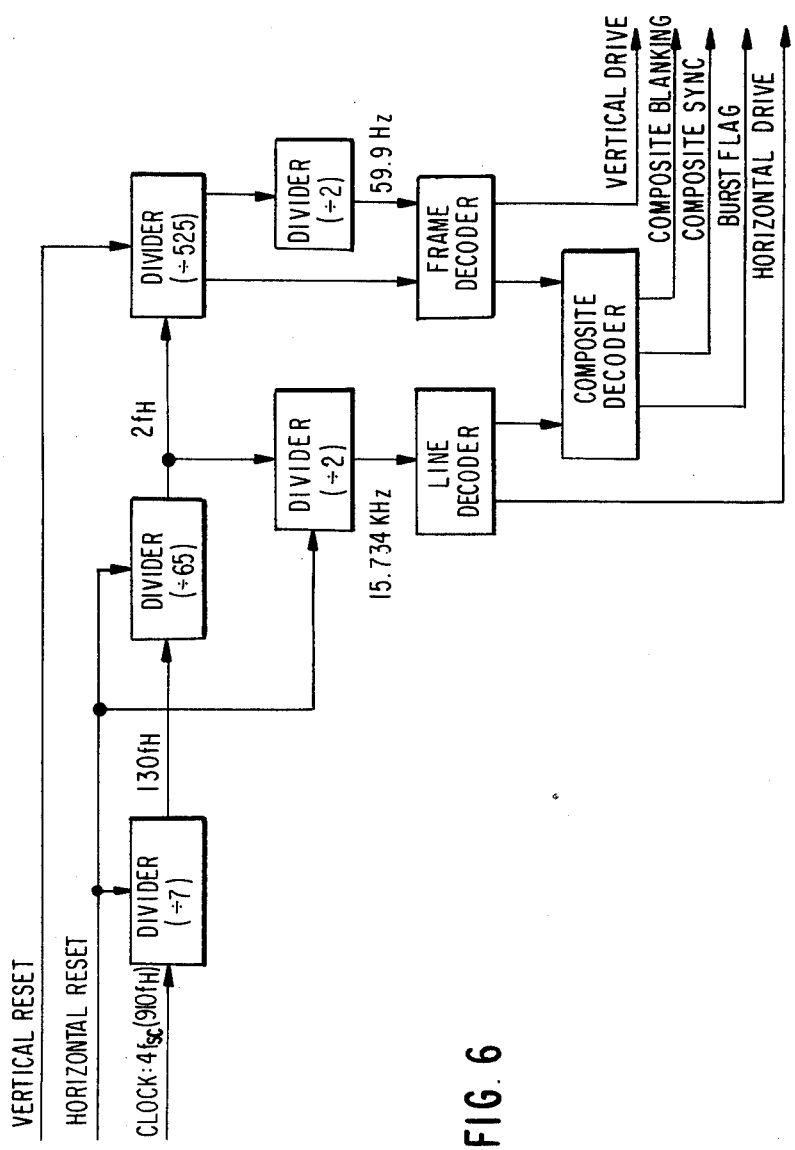
FIG. 6 is a schematic block diagram of a television synchronizing signal generator shown in FIG. 3.

The integrated circuit 3262A can be used for the television synchronizing signal generator 11'. FIG. 6 shows the block diagram of the synchronizing signal generator 11'.

What is claimed is:

1. A television synchronizing signal reproducing apparatus for reproducing at least one synchronizing signal from an input composite television video signal having at least a horizontal synchronizing signal and a burst signal having a subcarrier frequency, said apparatus comprising:

means receiving said input composite television signal for separating said horizontal synchronizing signal and burst signal from said input composite television video signal;

first producing means receiving said separated horizontal synchronizing signal for producing a first signal having the same frequency as said horizontal synchronizing signal and synchronized with said separated horizontal synchronizing signal;

second producing means for producing a second signal having a frequency n times said subcarrier frequency and synchronized with said separated burst signal;

means responsive to said reproduced subcarrier signal and said first signal for generating a horizontal reset pulse synchronized to said reproduced subcarrier signal; and reproducing means for reproducing said at least one television synchronizing signal, said reproducing means receiving said second signal as a clock and the output of said extracting means as said horizontal reset pulse.

2. A television synchronizing signal reproducing apparatus as claimed in claim 1, wherein said at least one reproduced synchronizing signal includes all of a composite synchronizing signal, a composite blanking signal and a burst signal said apparatus further comprising:

means for generating a reproduced burst signal by passing said reproduced subcarrier in response to said burst flag signal;

means for eliminating synchronizing signals from said input composite television video signal in response to said composite blanking signal; and means for adding said reproduced burst signal and said composite synchronizing signal to the input composite television video signal delivered from said eliminating means.

3. A television synchronizing signal reproducing apparatus as claimed in claim 1, wherein said at least one synchronizing signal reproduced by said reproducing means comprises at least one of a composite synchronizing signal, a composite blanking signal and a burst flag signal.

4. A television synchronizing signal reproducing apparatus as claimed in claim 1, wherein said first producing means includes a phase locked loop comprising:

a phase detector receiving said separated horizontal synchronizing signal as an input and receiving a second input;

a voltage controlled oscillator (VCO) resposive to the output of said phase detector for providing a third signal having a frequency $mf_H$ where m is an integer and $f_H$ is the frequency of said horizontal synchronizing signal;

second frequency-dividing means for frequency dividing the output of said VCO to provide said first signal; and feedback means for feeding back said first signal to said phase detector second input.

5. A television synchronizing signal reproducing apparatus as claimed in claim 4, wherein said second signal frequency $nf_{sc}$ and said third signal frequency $mf_H$ are equal.

6. A television synchronizing signal reproducing apparatus as claimed in claim 4, said apparatus further comprising B/W determining means responsive to said separated burst signal for determining whether said input television composite video signal is a color video signal or a black-and-white video signal, said reproducing means generating a horizontal driving signal, said feedback means selectively providing either said horizontal driving signal or said first signal to said phase detector second input in response to the output from said B/W determining means.

7. A television synchronizing signal reproducing apparatus as claimed in claim 4, further comprising selection means for selectively providing said third signal to said reproducing means as said clock input in place of said second signal when said B/W determining means detects a black-and-white input signal.

8. A television synchronizing signal reproducing apparatus as claimed in claim 1, wherein said extracting means comprises a reset pulse generator which receives said reproduced subcarrier signal as its set input and receives said first signal as its reset input.

* * * * *